United States Patent Office 2,780,554
Patented Feb. 5, 1957

2,780,554
WASHING AND WAXING COMPOSITION

Louis L. Lerner, Chicago, Ill., assignor to Allied Home Products Corporation, Beloit, Wis., a corporation of Wisconsin No Drawing. Application March 23, 1950,
Serial No. 151,527

2 Claims. (Cl. 106—10)

The present invention relates to aqueous emulsions for waxing certain surfaces, and to such compositions which may also preliminarily clean the surface to be waxed. In particular, it relates to a washing-and-waxing composition for use on automobiles and other objects having receptive surfaces.

It is well known that there are oil-in-water type of emulsions of certain water-immiscible materials, such as oils, waxes and wax-like materials, which involve cationically active emulsifiers, which emulsions are subject to exhaustion of the suspended phase onto certain surfaces, but not all surfaces, by certain surface phenomena. It is well known that certain emulsions having an emulsifier which is a water-soluble salt of a long-chain aliphatic amine, may be exhausted in a manner to deposit the emulsified phase onto cellulose surfaces, siliceous surfaces and oxidized metal surfaces, among others. Thus, the conventional cellulosic finish on the metal surface of an automobile body, for example, as well as its chrome surfaces and its glass surfaces, are proper receptive surfaces for such deposition of a suitable material to "wax" the body.

The present invention aims to utilize this type of deposition, by producing an emulsion composition for use as or in a water bath for waxing various surfaces, and in particular automobile bodies. But to wax a surface successfully, it is necessary that the surface be cleansed of dirt and thus be properly presented for exercise of those surface phenomena which function to exhaust the emulsion.

In one aspect, the present invention provides a composition which may be applied to clean surfaces to be waxed, which composition as applied is stable against depositing its waxing material by reason of inclusion of one or more agents to inhibit the tendency to be exhausted, but subject to treatment after application to destroy the inhibition. In another aspect, an inhibited composition may be applied to a dirty surface to be waxed, and in such case the composition is detergent in character so as to clean the surface while the deposition tendency is inhibited. Then the inhibition is exhausted or destroyed, thereby to effect deposition on the resulting cleansed surface.

In the case of automobiles where a washing-and-waxing composition of the present invention may be used in successive washings, it is observed that in the first use, the surface treated is preferably the surface of the body finish; and in the second and subsequent uses, the surface treated may be in part and largely the wax coat previously deposited. However, not every initial deposit so obtained is of such a character that it is a proper receptive surface to induce deposition thereon of another deposit of the same or other waxing material. Accordingly, for overcoming this condition, the present invention employs a composition which deposits a waxing coat of suitable character to induce a deposition thereon of a like or different wax coat by the exhaustion of a proper aqueous emulsion.

Accordingly, it is the general object of the invention to provide an exhaust-sensitive emulsion of waxing material in which the tendency to exhaust is specially inhibited in a manner readily to permit the removal or destruction of the inhibition to bring about the desired exhaustion and deposition of waxing material.

It is a general object of the invention to provide such an inhibited waxing composition having detergency to clean the surface before the deposition of waxing material is effected.

It is also a general object of the invention to produce a composition applicable in water dispersion to wash and wax certain surfaces.

It is a particular object of the invention to produce a composition applicable in water dispersion to wash and wax certain surfaces to provide a waxed surface subject to a like washing and waxing.

It is a particular object of the invention to provide a composition which may be used repeatedly on the surfaces of automobiles and other articles or materials to wash and wax the same without the necessity to remove the old waxing coat before rewaxing.

Another object of the invention is to provide a washing-and-waxing composition which when applied to automobiles deposits a coat which is "polished" as deposited, without need for a buffing action to effect a gloss.

It is a particular object of the invention to employ an emulsion of waxing material in water which is capable of exhaustion to deposit the same as a coat, to compound the emulsion so as to inhibit or retard the deposition, and also to compound the emulsion for detergent action prior to effecting the deposition of the waxing material.

Various other and ancillary objects and advantages of the invention will become apparent from the following description and explanation of the invention. It is to be understood that in illustrating the invention by giving the presently preferred compositions to exemplify it, the invention is not to be considered as limited to or by the detailed examples, and that numerous changes and modifications of it may be made within the scope of the appended claims.

In order to avoid complicating the disclosure at the outset with technical terminology identifying the ingredients, the invention is first explained on a functional basis.

There is a broad group of chemical compounds known as surface-active agents, or surfactants, which are classified as cationic, or anionic, or nonionic. The nonionic surfactants do not ionize in water and are long molecules which on one end are hydrophilic and lipophobic and on the other hydrophobic and lipophilic. The cationic and anionic surfactants ionize in water to provide charged ions of long molecular structure exhibiting the same two-ended differences as do the nonionic surfactants. Household fatty acid soap is an anionic surfactant in which the lipophilic hydrophobic end is on the negatively charged anion, which latter has the fatty acid radical. In cationic surfactants the lipophilic hydrophobic end is a part of the cation. Nonionic surfactants are compatible with both cationic and anionic surfactants.

Surfactants all have wetting, emulsifying, dispersing and detergent properties to a degree, some being stronger in one or more of such properties than in another. Some are characteristically detergents. Others are characteristically emulsifiers. Some are characteristically emulsifiers and detergents. See "Synthetic Detergents—up to date", by John W. McCutcheon, copyright 1949, MacNair Dorland Co., Inc., published in Soap and Sanitary Chemicals, Aug., Sept. and Oct. 1949.

In explaining the present invention the term "wax" is used in its popular sense, rather than in its technological meaning. The terms "wax" and "waxing material" herein signify a single substance or mixture which is, or which contains, a substance capable of forming a continuous water-repellent coat having a high polish or luster. All "waxes" are not suitable for use in this invention and those which may not be used under some conditions will be discussed in connection with the following explanation of the invention.

There is a certain class of well-known water-soluble cationic surfactants which are both emulsifiers and detergents. It is known that emulsions made with them have the remarkable property of exhausting the dispersed oil or wax onto certain types of surfaces. Cellulosic surfaces, siliceous surfaces, and oxidized metal surfaces all seem to be receptive of the oil or wax to effect exhaustion. These surfaces act like a magnet to the oil-phase of the emulsion.

When waxing material is made the dispersed phase in such an emulsion, there results a waxing composition. The waxing material may be chosen from many varieties, and those which are readily operative are saponifiable in character. They may be natural or synthetic in origin. The saponifiable materials may be esters or free acids. Many natural waxes are esters of monohydric alcohols and fatty acids, and these are the preferred ones. Stearic acid and lauric acid are considered by many to be waxes, and each is suitable for the present invention. Stearyl stearate is an example of a synthetic wax, and an example of many esters of natural or synthetic origin which are esters of aliphatic monohydric alcohols and aliphatic monocarboxylic acids. Spermaceti wax is another example, of animal origin, being cetyl palmitate. Other suitable natural waxes are: candelilla, carnauba, esparto and ouricury. Of course, the hard waxes are preferred for automobiles, but softer ones may be used for automobiles for cold weather or climates, or for special purposes.

Paraffin and ozokerite are hard hydrocarbon waxes. When the wax for the present invention consists of hydrocarbon wax, such as paraffin, ceresin, or ozokerite, alone or mixed, the emulsions are not stable or smooth, and in attempts to use them in the present invention, the deposits show spottiness and lumps, with loss of wax in the application in a manner to be described.

However, the invention permits the use of a hydrocarbon wax by using it as a component in a waxing mixture of materials, not necessarily all waxing materials, as will be later explained. The success of the many compositions formulated and tested in the development of this invention indicates that the suitable emulsions are those which are the soap-type of emulsions, such that a soap-forming reaction occurs, and a soap is formed and is present across the emulsion-interface between the emulsified phase and the aqueous phase. The current theory on such emulsions is that the aliphatic or hydrophobic part of the soap molecule lies in the oil-phase, and the hydrophilic part of the soap molecule lies in the aqueous phase. Therefore, the waxing material for the present invention must be saponifiable to a degree to form such an interfacial soap. A hydrocarbon wax is not at all saponifiable, but by an addition to it, an emulsifiable saponifiable mixture may be made which is operable in the present invention to effect deposition of the hydrocarbon as the wax coat.

Some waxes contain free acid, measured by the "acid number" of the wax. For example, carnauba wax has an acid number of 4 to 5, which means that 4 to 5 milligrams of potassium hydroxide are necessary to saponify the free acid content of 1 gram of the wax. Some waxes have a "saponification number," which represents the number of milligrams of potassium hydroxide completely to saponify the wax. Since some waxes have free acid to be saponified, as well as ester to be saponified, the difference between the saponification number and the acid number represents the number of milligrams of potassium hydroxide to saponify the "ester" constituent of the wax, as the "ester number."

The following average analyses of two waxes are given for the purpose of clarification:

|  | Carnauba Wax | Esparto Wax |
|---|---|---|
| Melting point °F | 182–184 | 150–160 |
| Acid No | 4–5 | 17–19 |
| Ester No | 70–72 | 30–32 |
| Saponification No | 74–77 | 47–51 |

The cationic emulsifier previously alluded to is hereinafter referred to as WSCED for the purpose of identification, meaning water-soluble or dispersible cationic emulsifying detergent. It is a suitable salt of a long-chain aliphatic amine, more particularly delimited hereinafter. It has the capacity to saponify the free acids in oils, fats, or waxes emulsified by it, as well as capacity to saponify the ester-waxes themselves to some degree in the process of producing the emulsion. The saponifications described are not quantitative, but are limited to some sort of interfacial saponification which effects the status of emulsion, whereby stability of the emulsion ensues. Consequently, when there is used a non-saponifiable wax, such as paraffin, having no such free acid, there is added a quantity of saponifiable wax or free acid to form a soap with the amine portion of the WSCED. Free fatty acid such as one having from 12 to 18 carbon atoms is therefore included, for example, lauric acid or stearic acid. Enough of the WSCED is used to effect saponification of saponifiable content to create enough soap for a stable emulsion.

Additionally over such amount of WSCED to form a stable emulsion a quantity in excess may be employed for its detergent function, if there is a deficiency of other compatible detergent substance. The detergent content otherwise may vary in degree as the detergent power is to be varied, and also as the inhibition is to be varied.

To give the detergency of the composition time in which to function, there is employed one or more of suitable inhibitors of the tendency to exhaust the emulsion. The exhaust-inhibitor must be compatible with the cationic emulsion. A nonionic water-soluble of water-dispersible surface-active agent is used as inhibitor because its nonionic character makes it compatible with the WSCED. For washing purposes the preferred inhibitor is one which is also a detergent, an emulsifier and a dispersant. The WSCED is chemically active, whereas nonionic inhibitors are inert chemicaly but active physically in the compositions of the present invention.

Without knowing the exact reason why the inhibitor functions, the manner in which the emulsion is preferably employed, leads to the supposition that its specified nonionic character strengthens or stabilizes the emulsion, thus to overcome the tendency of the cationic forces in WSCED which effect the deposition by exhaustion. This is plausible because in the washing and waxing compositions all the successful inhibiting agents have strong emulsifying power and per se do not form emulsions subject to exhaustion by the effect thereon of certain surfaces in contact therewith. As described later, it is the depletion or utilization of the inhibitor which renders the emulsion less stable and hence more responsive to the forces which tend to exhaust the WSCED emulsion.

The inhibitors are also excellent dispersants for solid substances, such as pigments or clays. The presence of the retarder in the washing-and-waxing composition permits exercise of said dispersing function to suspend clays and the like lifted from their lodging places by the detergent action, thus to float them away from the surface to be waxed prior to the beginning of the wax deposition. This action of the inhibitor is one which in effect utilizes it so that the remainder is less effective to stabilize the emulsion, thus bringing it toward the point of exhaustion.

Thus, the use of a normally stable emulsion of the present invention on a very dirty exhausting surface, may utilize the stabilizing detergent inhibitor to the point where exhaustion follows with a resulting deposition of wax on an incompletely cleaned surface. It has been observed in experience with various compositions, that the greater the amount of dirt on the surface to be washed and waxed, the greater must be the content of the inhibiting nonionic surface-active-agent.

Thus, for actual field use in washing automobiles, various grades of the composition are made available, adapted for use with a range of dirtiness from clean to the other extreme, however it may be expressed. A composition must be used which, in standing on the surface to be waxed, is not subject to utilization of nonionic detergent inhibitor to the point of exhaustion of the waxing material. However, this condition is not a factor where clean surfaces are to be waxed.

As stated above, there are two ways to lead up to the exhaustion point. One is by utilization as above described. The other is by depletion. Depletion may be effected by flushing with water a surface on which the emulsion has been applied. In the automobile cleaning field, the emulsion is compounded so that utilization, as above described, must be followed by depletion. Depletion is most easily effected merely by flushing with water. This is most desirable, because it permits the already lifted and suspended dirt and soil involved in the utilization, to be flushed away within an interval of time in which depletion takes place in attaining the deposition point. With choice of a proper composition, this assures deposition of wax on a cleaned surface. The inhibitor thus retards deposition to permit flushing away the dirt and soil. For this reason it is termed either as an inhibitor or a retarder.

The foregoing relationships between the general nature of the compositions and the way of using them, open the way to explain the invention with more particularity.

In using a washing-and-waxing emulsion, say for automobiles, the waxing material is preferably such that its coat need not be removed, and it must therefore be one which has the property of exhausting waxing material onto it from an exhaust-sensitive emulsion. To make a deposited wax coat from one emulsion receptive of a second wax coat from an exhaust-sensitive emulsion, the first emulsion is compounded to include that kind of WSCED which is of such character that some of it is retained in the wax deposit as a sort of wax-like diluent, and which has a molecule of such shape that when present in a coat of wax, it is, I believe, so oriented at the wax surface that the surface is sub-microscopically more irregular and such that its electric charges again effect emulsion-exhaustion. For this purpose I employ an oil-soluble or water-soluble type WSCED identified as dialkyl dimethyl quaternary ammonium salt, which is an emulsifying agent, a cationic surface active agent, and a detergent. Used alone as an emulsifier for wax it forms an emulsion subject to exhaustion of the wax as described. Being soluble in the waxes, it deposits, in part at least, with the wax. The higher its oil-soluble character, the greater its tendency to be included in the wax. It is believed that the long alkyl chains of the molecules are oriented into the wax coat with the N-bearing groups at the surface, whereby to break the continuity otherwise of an all-wax surface.

The WSCED as quaternary ammonium salts may be one or more having the general formula $RR'N(CH_3)_2Cl$ wherein R is an aliphatic radical having from 8 to 18 carbon atoms, and in which R' may be likewise. When R' is methyl ($CH_3-$) the compound is water-soluble, and the compound is an alkyl trimethyl quaternary ammonium salt. When R' is in the same class as defined for R, the compound is oil-soluble and water dispersible, and is a dialkyl dimethyl quaternary ammonium salt (hereinafter referred to as QAS), which is the preferred type for efficiency in modifying the wax coat to effect subsequent exhaustion of wax thereon. The following Table I represents commercially available quaternary ammonium salts which are useful in the present invention. The designation "Item" is in terms of published correlation of identification and composition:

TABLE I

*Average composition of alkyl radical R or RR' in percent*

| | Carbon Chain Length | Item 18 R-trimethyl | Item 8 R-trimethyl | Item 2C RR' dimethyl | Item 2HT RR' dimethyl |
|---|---|---|---|---|---|
| Octyl | 8 | | | 8 | |
| Decyl | 10 | | | 9 | |
| Dodecyl | 12 | | | 47 | |
| Tetradecyl | 14 | | | 18 | |
| Hexadecyl | 16 | 6 | 10 | 8 | 30. |
| Octadecyl | 18 | 93 | 10 | 10 | 70. |
| Octadecenyl | 18 | 1 | 35 | | |
| Octadecadienyl | 18 | | 45 | | |
| Percent Active Ingredient | | 33 | 33 | 75 | 75. |
| Percent Sodium Chloride | | 17 | 17 | 1- | 1-. |
| Percent Water | | 50 | 50 | | |
| Percent Isopropyl Alcohol | | | | 24 | 24. |
| Physical Character at 20° C | | Soft Paste | Heavy Fluid | Liquid | Soft Paste Liquid at 60° C. |

From the foregoing, it is clear that the composition of the effective QAS agent is represented generically by the formula $$RR'N(CH_3)_2Cl$$

in which R is an alkyl radical having from 8 to 18 carbon atoms, and R' is an alkyl radical having from 1 to 18 carbon atoms. The preferred compositions are those in which R' is of the same class as R. The harder the QAS, the more satisfactory it is, not only for its function, but also because its presence in a wax coat imparts high gloss. The form 2C is preferred.

Although QAS has been described, it is but one species of the generic WSCED compounds available for the invention. The WSCED may vary over a wide range of compositions. It is a water-soluble or water-dispersible acid salt of an aliphatic amine or mixture of such amines. Hydrochloride salts may be used, but the strong acid is corrosive. Preferably and safely for use on metal surfaces, the acetate salts of the amine are used. Eighty percent by weight of the aliphatic radicals of the amines should have from 12 to 18 carbon atoms. These compounds are commercially available, largely as mixtures. One species is a class of aliphatic primary amines. Another is a class of aliphatic secondary amines.

The following Table II gives several available mixtures of primary amines. The designation "Item" is in terms of published correlation of identification and composition:

TABLE II

*Primary aliphatic** amines*

| Item* | Mean Molecular Weight | Percent Content of Radical R in RNH$_2$ — Length of Carbon-Chain | | | | | | | |
|---|---|---|---|---|---|---|---|---|---|
| | | 8 | 10 | 12 | 14 | 16 | 18$^1$ | 18$^2$ | 18$^3$ |
| 12D | 185 | | | 90 | 9 | | | 1 | |
| 14 | 213 | | | 4 | 90 | 4 | | 2 | |
| T | 263 | | | | | 30 | 25 | 45 | |
| HTD | 264 | | | | | 25 | 70 | 5 | |
| 18D | 267 | | | | | 6 | 93 | 1 | |
| SD | 266 | | | | | 10 | 10 | 35 | 45 |
| OD | 200 | 8 | 9 | 47 | 18 | 8 | 5 | 5 | |

*The letter D denotes a distilled form of the material.
**Saturated except as otherwise indicated.
$^1$ Octadecyl.
$^2$ Octadecenyl.
$^3$ Octadecadienyl.

The following Table III gives several available mixtures of secondary amines. The designation "Item" is in terms of published correlation of identification and composition:

TABLE III

*Secondary (saturated) aliphatic amines*

| Item | Mean Molecular Weight | Percent Content of Radicals RR' in RR'NH — Length of Carbon-Chain | | | | | |
|---|---|---|---|---|---|---|---|
| | | 8 | 10 | 12 | 14 | 16 | 18 |
| 2C $^1$ | 435 | 8 | 9 | 47 | 18 | 8 | 10 |
| 2HT $^2$ | 520 | | | | | 25 | 75 |

$^1$ Light color—approximate M. P. 46° C.
$^2$ Light color—approximate M. P. 68° C.

The primary and secondary amines tabulated above are not the WSCED of the present invention. They must be converted to a water-soluble amine salt, preferably by neutralization with glacial acetic acid to form the acetate salt. The QAS is a chloride salt.

In the washing-and-waxing compositions, it is to be noted that the WSCED and the inhibitor-retarder are all detergents. None is anionic. Most anionic detergents are incompatible with the WSCED, which is cationic, and hence such detergents are avoided. For detergency in the composition any and all of said non-anionic materials may function. The WSCED in excess of that necessary for emulsification to stability, will serve as detergent. Where detergency is desired in a washing-and-waxing composition, it is preferable that the detergency be provided by the inhibiting retarders used, which are nonionic, and which in increasing amounts prolong the period of retardation.

The WSCED agents derived from the primary and secondary amines have no such effect on the character of the wax coat as does the QAS species of WSCED, and hence, where the exhausting character of the wax coat is not an objective, the QAS need not be employed as WSCED.

Accordingly, the composition comprises solid fusible waxing material emulsified by WSCED to give capacity for exhausting the emulsion, using preferably only a sufficient amount, if used as the sole emulsifier, to effect a stable emulsion including an amount to saponify at least some of the content of ester or free acid to effect a stable soap-emulsion. When such a stable emulsion contains a minimum amount of WSCED, it is not useful as a washing-and-waxing compound, because the WSCED is not free to act as a detergent, while engaged in position requiring its function as an emulsifier. Therefore, for effective detergency, more WSCED may be added, without, however, inhibiting the tendency to exhaust. But it is preferred to provide detergency entirely by use of inhibitor-detergent, as described, thereby decreasing sensitivity to exhaustion of the emulsion, and increasing detergency. For these results, there are numerous available inhibitor-detergents. Where there is the objective to deposit a waxing coat having the capacity to exhaust wax upon it from another emulsion, the QAS is employed as all or part of the WSCED.

The preferred inhibitor-detergents are water-soluble nonionic surface-active agents with strong emulsifying, dispersing and detergent properties. They are all large molecules and each is a condensation product. None is such an emulsifier as permits deposition of wax from an emulsion of wax made with it, as does WSCED. In contradistinction, the WSCED is a cationic emulsifier conductive to exhaustion of the dispersed phase by surface phenomena.

The chemical constitution of the inhibitor-retarder is not important except as it functions to produce a compound which is a nonionic surface-active agent, a dispersant, a detergent and an emulsifier, and which is stable and chemically inactive in mild acid and alkaline conditions_and hence in the presence of WSCED in all the compositions of the present invention.

There are numerous suitable agents on the market, the identity of which is not available to the public, and in some cases prehaps not known to the producer. They are all condensation reaction products, and hence complex. The following are particularly useful.

"Ninols" are trade-marked products of Ninol Laboratories, Chicago, Illinois, made in accordance with Kritchevsky U. S. Patent No. 2,089,212. They are condensation products of one mole of aliphatic monocarboxylic acid with at least two moles of alkylolamine. The compounds are readily dispersible or soluble in water, are stable in mildly acid and alkaline media, and are effective in the presence of calcium and magnesium ions. They are surface-active agents, functioning as detergents, and as agents for dispersing and emulsifying solids and liquids in water.

The higher fatty acids (six or more carbon atoms) are preferred for the aliphatic radical. One such compound is "Ninol 979." It is a 100% active, nonionic, pale amber liquid with a specific gravity of 1.00, corresponding to the product of condensing lauric acid with diethanolamine.

The properties of the "Ninols" change in degree as the composition varies, and with different ones the amounts required vary for any predetermined extent of function. Hence, where an amount is specified in a formula herein, the particular member of the family is specified.

"Ethofats" are trade-marked products of Armour and Company, Chemical Division, Chicago, Illinois. They are a family of fat-derived nonionic surface-active agents. They are polyoxyethylene-glycol esters of fatty acids, having the general formula:

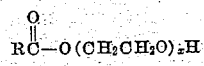

$$R\overset{O}{\underset{\|}{C}}-O(CH_2CH_2O)_xH$$

They vary from fluid liquids to soft pastes depending upon length and saturation of the fatty chain and the relative proportion of the polyethylene glycol residue, which factors also control the solubilities. As the value of $x$ increases in a given formula, the material becomes more soluble in water and correspondingly less soluble in non-polar organic compounds. All of the "Ethofats" are water-soluble or water-dispersible.

The "Ethofats" are resistant to hydrolysis and therefore, stable to mildly acid and alkaline conditions. They are unaffected by calcium, magnesium or other hard water ions. They are compatible with nearly all types of surface-active agents, and function as detergents and as dispersing and emulsifying agents.

The polyethylene glycol employed for the material may have a molecular weight from 220 to 2200, which determines the value of $x$ in the formula. The radical R in the formula is a fatty acid radical, saturated or unsaturated, or mixed radicals of the acids caprylic, capric, lauric, myristic, palmitic, stearic, oleic, linoleic, linolenic, and rosin acids.

"Ethofat 242" is one in which the radical R, taken as 100%, consists of 15% of oleyl radical, 15% of linoleyl radical, and 70% of the radicals of rosin acids.

Since the value of $x$ in the general formula may vary and in the commercially available "Ethofats" varies from 5 to 50, the constitution and hence the solubility are indicated in the commercial identification, thus:

"Ethofat 242/$(x+10)$"

"Ethofat 242/60" is thus a mono-ester of mixed organic acids R (as specified above) with polyoxyethylene glycol addition having an average molecular weight of 2200, corresponding to $x=50$. Likewise, "Ethofat 242/20" involves instead a polyoxyethylene glycol having an average molecular weight of 440, corresponding to $x=10$.

The foregoing information is found in bulletins by the manufacturer, and in part has been abstracted from Chemical and Engineering News, vol. 27, No. 39, September 26, 1949, page 2756.

The compounds "Neutronyx" are a family of trademarked materials made by Onyx Oil Chemical Company, Jersey City 2, New Jersey. They are nonionic surface-active agents, functioning as detergents, emulsifiers and dispersants. They vary from liquids to low-melting wax-like solids, all dispersible in water. Being nonionic they are compatible with cationic and other nonionic compounds, such as quaternary ammonium compounds. They are stable in mildly acid and alkaline solutions.

Chemically, they are ethers, the various kinds being designated commercially by a number:

No. 330—Polyalkylether condensate of fatty acids.
No. 600—Aromatic polyglycol ether, and specifically alkyl phenyl ether with polyethylene glycol.
No. 834—Polyalkyl ether condensate of fatty acids.

"Neutronyx 600" is miscible in all proportions in water, has a specific gravity of about 1, and in a 1% solution in water a pH of 7.3.

The "Tritons" are trade-marked materials of Rohm & Haas, Philadelphia 5, Pa. They are surface active agents functioning as detergents, and as agents for dispersing and emulsifying. They vary from nonionic, to cationic and anionic activity, and are stable in strong acid and alkaline solutions.

The nonionic ones are commercially designated and identified as follows:

|       | Percent Solids | pH     | Type                          |
|-------|---------------|--------|-------------------------------|
| X-30  | 30            | 7.5-10 | Alkylated aryl poly-ether alcohol. |
| X-100 | 100           | 7.5-10 | Do.                           |

The above compounds are soluble in cold water in all proportions. They are compatible with both cationic and anionic active materials. Activity is not affected by hard water.

For convenience, the foregoing examples of retarders are referred to as follows:

TABLE IV

"Ninol 979" _____ RA
"Ethofat 242/20" _____ RB
"Neutronyx 600" _____ RC
"Triton X-100" _____ RD The various degrees of freedom in compounding formulations according to this invention are represented in the following examples:

EXAMPLE 1 (NO. 645)

| | Parts by weight |
|---|---|
| WSCED 18D | 17 |
| WSCED-QAS-2C | 7.0 |
| Carnauba wax | 5.2 |
| Esparto wax | 1.3 |
| RB | 6.0 |
| Water to make | 250 |

All materials of the above formulation except the water are heated and mixed to a homogeneous fusion at a temperature around 82° C. Then the water at a temperature hotter than the fusion, preferably 10° C. hotter, is added slowly while stirring continuously as with a power agitator or stirrer. At this time a slight odor of acetic acid may be noted, resulting from saponification of the waxes, releasing acetic acid from the acetate salts of WSCED 18D. This mechanical action is maintained until the mass has cooled to about 45° C. The physical state changes from an initial condition through a jelly-like stage including a translucent stage, and finally to an opaque stage which is the oil-in-water emulsion.

The above formula in emulsion form may be diluted with about 14 to 16 times its weight in water to provide a working washing-and-waxing bath. To wash an automobile with it, one merely applies the dilution as a wash, rubbing it on as a wash. Then it is flushed off with water, as by playing a gentle stream on it from a hose. As the flushing takes place, the dirty water rolls off and in a few measurable seconds the surface becomes water-repellant. This evidences wax deposition. On drying, preferably by a light use of a cloth, there is a glossy waxed surface. The act of deposition makes the surface water-repellant, almost pushing the residual water away. The water remains as globules or droplets which may contain some dirt and continued flushing removes these.

The applied diluted emulsion clings to the body surface and when flushed with water it is not readily distended to float away in the flushing water. Rather, it seems that on dilution by the rinsing water, some interval inversion takes place and the wax strikes in to the clean surface while the residual contents and dirt are distended by water and are repelled by the wax deposit. If the deposition takes place too quickly, the wax deposit entraps dirt before it is dispersed and flushed away. Delay of deposition upon the dilution by flushing is important for waxing initially dirty surfaces.

EXAMPLE 2 (NO. 228)

| | Parts by weight |
|---|---|
| WSCED-12D | 4 |
| Carnauba wax | 18 |
| RA | 10 |
| Water to make | 500 |

The above formula is made and used as described in Example 1.

EXAMPLE 3 (NO. 229)

In Example 2 the WSCED-12D is changed to a like amount of WSCED-SD.

EXAMPLE 4 (NO. 230)

| | Parts by weight |
|---|---|
| WSCED-12D | 4 |
| Carnauba wax | 18 |
| RA | 1 |
| RC | 9 |
| Water to make | 500 |

EXAMPLE 5 (NO. 235)

| | Parts by weight |
|---|---|
| WSCED-CD | 2 |
| WSCED-12D | 2 |
| Carnauba wax | 18 |
| RC | 10 |
| Water to make | 500 |

EXAMPLE 6 (NO. 341)

| | Parts by weight |
|---|---|
| WSCED-C | 8.2 |
| Carnauba wax | 10.0 |
| Candelilla wax | 2.8 |
| RC | 10.0 |
| Water to make | 500.0 |

The actual time period of retarding the deposition is difficult of accurate determination for lack of standard dirty surfaces for test and lack of standard methods of application. Yet by attempted standardized manipulations and repeated tests of a single composition, an average time may be determined to measure comparative effects. Also by increasing the amount of retarder in an otherwise fixed composition, the prolongation of the retarding period becomes clearly evident.

*Standard test.*—By testing the formulations before dilution to 14 to 16 times its volume for actual use, the delay can be indicated. The times observed are comparative ones for the test conditions. A weighed amount of the formulation as given above is placed on a clean nitrocellulose lacquered surface of a metal jar cap and spread with the finger. This forms a thick creamy layer on the cap, which is not easily distended and flushed away by playing a gentle stream of water on it, which is then effected in the test by use of a laboratory wash bottle. The flushing is timed from the beginning, and as it continues there comes a time when the cap begins to repel the liquid and present a dry waxed surface growing in area from one or more foci. The time for this action to thus wax the whole cover is the delay time recorded. It appears that the flushing action removes the nonionic emulsifier from association with the wax and in a manner to weaken the inhibition to the point at which the wax deposits. In use on a dusty surface, the inhibitor may be removed before dirt is lifted and floated away by the flushing, thus depositing wax on a dirty surface, with a noticeable streaky effect. Use of sufficient inhibitor prevents this.

In actual practice, in washing a dirty automobile body, the application of the diluted formulation is mechanical and this effects a cleaning action. While the whole body is being covered, the detergency in that already applied is functioning. In a proper composition, there is ample time to begin the flushing. The virtue of retarded deposition requiring depletion after utilization, is to give ample time to float and flush away dirt so that deposition of wax will not entrap any dirt in the coat and give a spotty or streaky appearance. The dirtier the surface to be cleaned the more danger there is of dirt-entrapment. A deficiency of retarder for the average dirty body, lessens the cleansing action as well as the delay period, with increased danger of entrapment.

The following series of examples show numerous comparative formulations, and measured delay periods made by the standard test, for the purpose of demonstrating the function and degree of functioning of the various retarders used in various amounts in compositions varying in other components. The delay periods given are averaged ones determined in several standard tests each using one-half gram of the given formulation on a test cap 2¼ inches in diameter with a slightly convex face.

TABLE V.—EXAMPLES 7 TO 11
[Formulations include water to 250 gms.]

| Example | No. | WSCED | Wax | Retarder | Seconds |
|---|---|---|---|---|---|
| 7 | 220 | 2 gm. 12D | 9 gm. Carnauba | 5 gm. RC | 3.5 |
| 7a | 220a | 2 gm. 12D | do | 30 gm. RC | 4.9 |
| 8 | 228 | 2 gm. 12D | do | 5 gm. RA | 5.1 |
| 8a | 228a | 2 gm. 12D | do | 30 gm. RA | 6.7 |
| 9 | 232 | 2 gm. C | do | 5 gm. RC | 2.75 |
| 9a | 232a | 2 gm. C | do | 30 gm. RC | 5.8 |
| 10 | 233 | 2 gm. T | do | 5 gm. RC | 2.4 |
| 10a | 233a | 2 gm. T | do | 30 gm. RC | 4.3 |
| 11 | 433 | 17 gm. 18D | do | 1 gm. RD | 7.0 |
| 11a | 433a | 17 gm. 18D | do | 26 gm. RD | 8.1 |

The foregoing table shows that increasing the quantity of retarder increases the delay time.

TABLE VI.—EXAMPLE 12

| | Grams |
|---|---|
| WSCED-QAS-18 | 20.0 |
| Carnauba wax | 1.6 |
| Candelilla wax | 4.8 |
| Retarder in grams | as below |
| Water to make | 250.0 |

| Example | No. | Retarder | Seconds |
|---|---|---|---|
| 12a | 1050 | 2 gm. RA | 9.8 |
| 12b | 1050a | 12 gm. RA | 20.4 |
| 12c | 1051 | 2 gm. RD | 8.4 |
| 12d | 1051a | 12 gm. RD | 13.8 |
| 12e | 1052 | 2 gm. RC | 10.2 |
| 12f | 1053 | 2 gm. RB | 6.5 |

The foregoing table shows various combinations of four retarders with the remaining ingredients fixed, and shows also that increasing retarder increases the delay time.

TABLE VII.—EXAMPLE 13

| | Grams |
|---|---|
| WSCED-QAS-S | 20.0 |
| Carnauba wax | 1.6 |
| Candelilla wax | 4.8 |
| Retarder in grams | as below |
| Water to make | 250.0 |

| Example | No. | Retarder | Seconds |
|---|---|---|---|
| 13a | 1054 | 2 gm. RA | 1 |
| 13b | 1054a | 12 gm. RA | 4.4 |
| 13c | 1055 | 2 gm. RD | 3.5 |
| 13d | 1056 | 2 gm. RC | 1 |
| 13e | 1057 | 2 gm. RB | 1 |

The above table shows a series similar to that in Table VI with a different WSCED-QAS and with the same variations on retarder. The two tables together show that the retarding function is influenced by change in the WSCED.

TABLE VIII.—EXAMPLE 14

| | Grams |
|---|---|
| WSCED-QAS-2HT | 20.0 |
| Carnauba wax | 1.6 |
| Candelilla wax | 4.8 |
| Retarder in grams | as below |
| Water to make | 250.0 |

| Example | No. | Retarder | Seconds |
|---|---|---|---|
| 14a | 1058 | 2 gm. RA | 16.2 |
| 14b | 1058a | 12 gm. RA | 24.2 |
| 14c | 1059 | 2 gm. RD | 14.4 |
| 14d | 1059a | 12 gm. RD | 33 |
| 14e | 1060 | 2 gm. RC | 29 |
| 14f | 1061 | 2 gm. RB | 17.8 |

The above table indicates that the retarders function more as such when using WSCED-QAS-2HT, compared with those used in Tables VI and VII.

TABLE IX.—EXAMPLE 15

| | Grams |
|---|---|
| WSCED-QAS-2C | 20.0 |
| Carnauba wax | 1.6 |
| Candelilla wax | 4.8 |
| Retarder in grams | as below |
| Water to make | 250.0 |

| Example | No. | Retarder | Seconds |
|---|---|---|---|
| 15a | 1062 | 2 gm. RA | 21.6 |
| 15b | 1062 | 12 gm. RA | 26.4 |
| 15c | 1063 | 2 gm. RD | 1.8 |
| 15d | 1063 | 12 gm. RD | 7.6 |
| 15e | 1064 | 2 gm. RC | 2.1 |
| 15f | 1065 | 2 gm. RB | 1.0 |

The above table indicates that the combination of RA with QAS–2C gives more delay than with the QAS shown in Tables VI to VIII.

TABLE X—EXAMPLE 16

|  | Grams |
|---|---|
| WSCED–18D | 17.0 |
| WSCED–QAS–2C | 7.0 |
| Carnauba wax | 5.2 |
| Esparto wax | 1.3 |
| Retarder in grams | as below |
| Water to make | 250.0 |

| Example | No. | Retarder | Seconds |
|---|---|---|---|
| 16a | 645 | 6 gm. RA | 16.7 |
| 16b | 645a | 8.5 gm. RA | 21.9 |
| 16c | 645b | 18.5 gm. RA | 30.0 |
| 16d | 645c | 31 gm. RA | 41.5 |

The foregoing shows a composition having a mixture of compounds WSCED, and for it a progressive increase in RA, which increase functions to increase the delay period.

TABLE XI—EXAMPLE 17

|  | Grams |
|---|---|
| WSCED–18D | 17.0 |
| WSCED–QAS–2C | 7.0 |
| Carnauba wax | 5.2 |
| Esparto wax | 1.3 |
| Mixed retarders in grams | as below |
| Water to make | 250.0 |

| Example | No. | 1st Retarder | 2nd Retarder | Seconds |
|---|---|---|---|---|
| 17a | 645d | 2.5 gm. RC | 6 gm. RA | 21.5 |
| 17b | 645e | 12.5 gm. RC | 6 gm. RA | 23.3 |
| 17c | 645f | 2.5 gm. RD | 6 gm. RA | 20.5 |
| 17d | 645g | 12.5 gm. RD | 6 gm. RA | 24.6 |

The foregoing shows the composition of Example 16a (No. 645) with various added amounts of another retarder, either RC or RD.

TABLE XII—EXAMPLE 18

|  | Grams |
|---|---|
| WSCED as below | 8.5 |
| Carnauba wax | 2.6 |
| Retarder in grams | as below |
| Water to make | 250.0 |

| Example | No. | WSCED | Retarder | Seconds |
|---|---|---|---|---|
| 18a | 11–1 | 2C | 60 gm. RA | 11.8 |
| 18b | 11–1a | 2C | 85 gm. RA | 17.0 |
| 18c | 11–2 | 2HT | 60 gm. RC | 17.0 |
| 18d | 11–2a | 2HT | 85 gm. RC | 22.8 |
| 18e | 11–3 | 2C | 60 gm. RD | 21.0 |
| 18f | 11–3a | 2C | 85 gm. RD | 26.8 |
| 18g | 11.4 | 2HT | 20 gm. RD | 7.1 |
| 18h | 11.4a | 2HT | 45 gm. RD | 13.0 |

The foregoing shows WSCED compounds which are acetates of secondary amine.

EXAMPLE 19 (NO. 1021)

|  | Grams |
|---|---|
| WSCED–18D | 8.5 |
| WSCED–QAS–2C | 3.5 |
| Carnauba wax | 2.6 |
| Esparto wax | 0.65 |
| Retarder RA | 60.0 |
| Water to make | 250.0 |

Seconds—20.4

The foregoing is like Example 16, with half as much of the same WSCED compounds and of carnauba wax, an increased amount of esparto wax and increased amounts of RA.

All of the foregoing examples involve primarily the fatty-acid-ester waxes, but the invention is not so limited. Attempts to substitute hydrocarbon waxing material, such as paraffin or ozokerite, for such ester-waxes have not been successful in producing a comparable composition and a comparable result, although they respond to use in the same manner. An emulsion of hydrocarbon wax may be formed and it will deposit in the standard test with a delay period, but the emulsion is not stable for long standing, to permit it to be diluted for practical use as described in Example 1. As originally formed, it is a lumpy or grainy emulsion, and the wax coat formed is lumpy.

However, it has been found that when a hydrocarbon wax is used along with other content to react with the WSCED to form a soap-emulsion, the hydrocarbon wax may be used to form a stable, distensible smooth emulsion, suitable for depositing a smooth non-grainy coat of hydrocarbon wax.

When the waxing material consists of stearic acid, or lauric acid, either one will form a smooth emulsion and deposit the acid as a wax, these acids being water-insoluble ones. The addition of fatty acid to a hydrocarbon wax, such as paraffin, or ozokerite, is sufficient to render the hydrocarbon a suitable waxing material for this invention. It is not essential that the fatty acid be one which per se is a waxing material, or which is water-insoluble as described for stearic acid and lauric acid. The fatty acid may be even lower in molecular weight, such as butyric acid. The latter is water soluble, but owing to its bad odor it is not acceptable for practical purposes. In forming a soap emulsion, butyric acid likewise releases acetic acid and forms from the acetate forms of WSCED an aliphatic amine butyrate, which is an invert soap, having a hydrophobic cation, contrasted with ordinary domestic alkali metal soaps which have a hydrophobic anion. The reaction of butyric acid to release a stronger acetic acid, is only indicative that the soap-forming reaction in emulsification is an equilibrium reaction.

In order to exemplify how such variations may be made, the emulsion formulation is herein disclosed by dividing it into Part E, comprising the WSCED, the retarder and water, and Part W comprising the waxing material and acid, or the waxing material which is the acid.

TABLE XIII.—PART E

[Quantities in grams]

| Part | WSCED 18D | WSCED 2C | WSCED–QAS–2C | RA | RB | Water to Make— |
|---|---|---|---|---|---|---|
| E–1 | 8.5 |  | 3.5 | 60 |  | 250 |
| E–2 |  |  | 15. | 60 |  | 250 |
| E–3 | 8.5 |  |  | 60 |  | 250 |
| E–4 | 8.5 |  | 3.5 |  | 60 | 250 |
| E–5 | 8.5 |  |  |  | 60 | 250 |
| E–6 |  |  | 15. | 60 |  | 250 |
| E–7 |  |  | 15. |  | 60 | 250 |
| E–8 |  | 8.5 |  | 60 |  | 250 |
| E–9 |  | 8.5 |  |  | 60 | 250 |

TABLE XIV.—PART W

[Quantities in grams]

| Part | Hydrocarbon Wax | | Acid | | |
|---|---|---|---|---|---|
| | Paraffin | Ozokerite | Stearic | Lauric | Butyric |
| W-1 | | | 3.25 | | |
| W-2 | .65 | | 2.6 | | |
| W-3 | | | | 3.25 | |
| W-4 | .65 | | | 2.60 | |
| W-5 | .65 | | | | 2.6 |
| W-6 | | | 1.6 | 1.6 | |
| W-7 | | | 1.6 | | 1.6 |
| W-8 | | | | 1.6 | 1.6 |
| W-9 | .65 | | 1.3 | 1.3 | |
| W-10 | .65 | | 1.3 | | 1.3 |
| W-11 | .65 | | | 1.3 | 1.3 |
| W-12 | | | 1.1 | 1.1 | 1.1 |
| W-13 | .65 | | .86 | .86 | .86 |
| W-14 | | .65 | 2.6 | | |
| W-15 | | .65 | | 2.6 | |
| W-16 | | .65 | | | 2.6 |
| W-17 | | 3.25 | | | |
| W-18 | 3.25 | | | | |

The following combinations in Table XV consist of one Part E from Table XIII and one Part W from Table XIV. In those combinations where a delay time is given, derived by the standard test, the combination identified by an example number in the table, represents compositions which are stable for long periods, which are smooth emulsions, and which deposit hard self-polished coats of wax by the method described. Where the delay time is not given and letters are used in the column for example numbers, the formed emulsion is not smooth, but rather is grainy, is not stable for long periods, and not practicable for use to deposit smooth self-polished coats of wax. However, such compositions function to deposit waxing material when applied by the same method of spreading and flushing, and they exhibit the described delay period to permit the flushing, and resulting from the flushing. These are described below, under the heading Other Formulations.

TABLE XV

| Example Number | Test Number | Part E | Part W | Seconds |
|---|---|---|---|---|
| 20 | 1 | E-1 | W-1 | 21.6 |
| 21 | 2 | E-1 | W-2 | 17.0 |
| 22 | 3 | E-1 | W-3 | 18.1 |
| 23 | 4 | E-1 | W-4 | 13.3 |
| 24 | 6 | E-1 | W-5 | 9.5 |
| 25 | 7 | E-1 | W-6 | 14.6 |
| 26 | 8 | E-1 | W-7 | 9.8 |
| 27 | 9 | E-1 | W-8 | 7.6 |
| 28 | 10 | E-1 | W-9 | 8.8 |
| 29 | 11 | E-1 | W-10 | 9.4 |
| 30 | 12 | E-1 | W-11 | 8.3 |
| 31 | 13 | E-1 | W-12 | 9.5 |
| 32 | 14 | E-1 | W-13 | 10.1 |
| 33 | 15 | E-2 | W-1 | 10.5 |
| 34 | 16 | E-2 | W-2 | 14.5 |
| 35 | 17 | E-2 | W-3 | 26.1 |
| 36 | 18 | E-2 | W-4 | 13.3 |
| 37 | 19 | E-3 | W-1 | 18.6 |
| 38 | 20 | E-3 | W-2 | 15.3 |
| 39 | 21 | E-3 | W-3 | 13.3 |
| 40 | 22 | E-3 | W-4 | 13.6 |
| 41 | 23 | E-4 | W-1 | 18.6 |
| 42 | 24 | E-4 | W-2 | 14.1 |
| 43 | 25 | E-4 | W-3 | 32.1 |
| 44 | 26 | E-4 | W-4 | 15.8 |
| 45 | 27 | E-3 | W-14 | 17.5 |
| 46 | 28 | E-1 | W-15 | 11.5 |
| 47 | 29 | E-1 | W-16 | 10.1 |
| A | 30 | E-5 | W-17 | |
| B | 31 | E-3 | W-17 | |
| C | 32 | E-3 | W-18 | |
| D | 33 | E-5 | W-18 | |
| E | 34 | E-6 | W-18 | |
| F | 35 | E-7 | W-18 | |
| 48 | 36 | E-8 | W-2 | 16.8 |
| 49 | 37 | E-8 | W-4 | 19.8 |
| 50 | 38 | E-9 | W-1 | 32.8 |
| 51 | 39 | E-8 | W-1 | 18.5 |

TABLE XVI.—EXAMPLE 52

| | Grams |
|---|---|
| WSCED–HTD | 8.5 |
| WSCED–GAS in gms | as below |
| Carnauba wax | 3.25 |
| Retarder in gms | as below |
| Water to make | 250.0 |

| Example | No. | Retarder | –QAS– | Seconds |
|---|---|---|---|---|
| 52a | 2024 | 60 gm. RA | | 29.0 |
| 52b | 2025 | 60 gm. RA | –2C, 3.5 gm | 17.2 |
| 52c | 2026 | 60 gm. RB | | 30.0 |
| 52d | 2027 | 60 gm. RB | –2C, 3.5 gm | 27.0 |

The foregoing is merely exemplary of formulations made with WSCED–HTD, an item in Table II not elsewhere exemplified herein.

EXAMPLE 53 (NO. 427)

| | Grams |
|---|---|
| WSCED–HTD | 1.6 |
| Carnauba wax | 4.8 |
| Candelilla wax | 16.0 |
| Water to make | 250.0 |

Example 53 represents an emulsion which is substantive to a clean automobile body and other exhaust-sensitive surfaces. Merely spreading it as a film on a cleaned body will effect wax deposition. A residue of the emulsifier is left, which by its presence adversely affects the character of the deposit. By applying a film of the emulsion and flushing, the deposit is smoother and of the desired character as a waxing coat. This example, made with an additional quantity of detergent stabilizer or retarder, gives the specified delay time, in which the detersive effect takes place prior to deposition.

Other formulations

The invention exemplified in Examples 1 through 52, relates to the preferred compositions, suitable for waxing, or for washing and waxing, bodies such as automobiles, where a high degree of uniformity and luster are required.

However, there are other uses to which those preferred compositions may be applied, wherein the requirements are not so drastic. By the same method of spreading a film of emulsion on a surface to be waxed, and then flushing to secure a delayed deposition of wax, other compositions may be used which are not suitable to the public demand; for example, to wash and wax an automobile. Metal plate, machine bases, metal walls, cement floors, and like bodies, may be waxed by the said flushing process.

In Table XV, there are available certain formulations where the waxing material consists of hydrocarbon wax. These emulsions are not both smooth and stable, but they do deposit wax in a delay period by the flushing process. As examples of compositions responding to the flushing process, they are herewith identified by example numbers and their qualities mentioned in more detail.

TABLE XVII

| Example Number | Test No., Table XV | Character as Made | Stability on Standing | Delay Test, Seconds (before cracking) |
|---|---|---|---|---|
| 54 | 30 | thin | Cracked | 15.6 |
| 55 | 31 | do | do | 7.5 |
| 56 | 32 | do | do | 9.5 |
| 57 | 33 | do | do | 23.0 |
| 58 | 34 | do | Slightly grainy | 18.1 |
| 59 | 35 | do | Fair | 17.0 |

It is noted that Examples 57 and 58 have been made with a WSCED consisting of the QAS form. This form leads to a more stable emulsion than the WSCED forms of the type listed in Table II, where there is a tendency toward instability. This superiority of the QAS form also prevails in use of synthetic waxes of the types illustrated by the examples in Table XVIII. Such waxes are available largely as trade-marked products, as follows:

"Halowax" is a trademark for synthetic waxes which are chlorinated naphthalene, referred to in Table XVIII as H–1001 and H–1014. These two species have properties given in publications by Union Carbide and Carbon Corporation of New York, N. Y., as follows:

|  | H–1001 | H–1014 |
|---|---|---|
| Modified ASTM softening point | 194–201°F | 277–283°F. |
| Specific gravity at 77°F | 1.53–1.59 | 1.75–1.81. |
| Distillation range (ASTM) | 600–650°F | 680–730°F. |
| Flash point (ASTM) | 284°F | 392°F. |
| Fire point (ASTM) | None to boiling | None to boiling. |

"Glyco Wax S 392" is a water-insoluble synthetic edible wax-like ester melting at 57°–61° C., having a flash point of 328° C., and a softening point within 1° C. of its melting point. It is manufactured by Glyco Products Co., Inc., Brooklyn 2, New York. It is probably a fatty acid ester of a polyhydric alcohol. It is herein designated as G–S–392.

"Acrawax C" is a water-insoluble synthetic wax, available in several forms of which the powdered form is herein employed (95% through 100 mesh). It has a melting point of 140°–142° C., and a flash point of 285° C. It is probably a fatty acid ester of polyhydric alcohol, made by said Glyco Products Co., Inc. It is referred to herein as A–C.

"Opalwax No. 10," is a fully hydrogenated castor oil. As used herein it is referred to as O–10.

TABLE XVIII

*Common formula*

|  | Grams |
|---|---|
| WSCED–, if 18D | 8.5 |
| WSCED–, if QAS–2C | 15.0 |
| Synthetic wax | 3.25 |
| Retarder | 60 |
| Water to make | 250 |

| Example No. | Formula No. | WSCED | Retarder | Wax (see below) | Test Seconds |
|---|---|---|---|---|---|
| 60 | 2000 | 18D | RA | H–1001 | 16.5. |
| 61 | 2001 | 18D | RB | H–1001 | 20.0. |
| 62 | 2002 | QAS–2C | RA | H–1001 | 23.2. |
| 63 | 2003 | QAS–2C | RB | H–1001 | 21.2. |
| 64 | 2004 | 18D | RA | H–1014 | 16.5. |
| 65 | 2005 | 18D | RB | H–1014 | 21.2. |
| 66 | 2006 | QAS–2C | RA | H–1014 | 18.0. |
| 67 | 2007 | QAS–2C | RB | H–1014 | 24.0. |
| 68 | 2008 | 18D | RA | G–S–932 | 22.7. |
| 69 | 2009 | 18D | RB | G–S–932 | 24.5. |
| 70 | 2010 | QAS–2C | RA | G–S–932 | 24.2. |
| 71 | 2011 | QAS–2C | RB | G–S–932 | 17.0. |
| 72 | 2012 | 18D | RA | A–C–Pow | 21.2. |
| 73 | 2013 | 18D | RB | A–C–Pow | 37.2. |
| 74 | 2014 | QAS–2C | RA | A–C–Pow | 20.0. |
| 75 | 2015 | QAS–2C | RB | A–C–Pow | 19.2. |
| 76 | 2020 | 18D | RA | O–10 | 17.5. |
| 77 | 2021 | 18D | RB | O–10 | 41.5. |
| 78 | 2022 | QAS–2C | RA | O–10 | 17.0. |
| 79 | 2023 | QAS–2C | RB | O–10 | 32.0. |

The stability of the above emulsions varies. Stability, as used in this application, is measured by observation, three days after making.

By example numbers they are grouped:

Early separation __ 60, 68, 72, 74, 76.
Signs of cracking __ 61, 64, 65, 73, 75.
Stability fair to good 62, 63, 66, 67, 69, 70, 71, 77, 78, 79.

From the foregoing it is seen that there is no absolute rule pertaining to stability, but where the QAS is employed it leads generally to stability. Exceptions in Examples 74 and 75 are noted.

Any of the above formulations should be used as freshly made or before they become too cracked, broken or separated to respond to the method, for the quality of deposit desired.

The water-soluble non-ionic emulsifier of the present invention need not be of detergent character for providing an emulsion capable of deposition of its waxing content by the flushing process. The following example illustrates:

EXAMPLE 80

|  | Parts by weight |
|---|---|
| Paraffin | 32.0 |
| WSCED–HT | 5.6 |
| Span 40 | 1.2 |
| Tween 40 | 1.2 |
| Water | 60.0 |

The "Spans" and "Tweens" are trade-marked surfactants made by Atlas Powder Company. Span 40 is sorbitan monopalmitate. It is a waxy solid, insoluble in water at 250° C., and dispersible in water at 50° C. Tween 40 is polyoxyethylene sorbitan monopalmitate. It is an oily liquid which is a water-soluble emulsifier, and nonionic in character. It lacks detergent properties.

The above formula in emulsification passes through a water-in-oil emulsion to an oil-in-water emulsion. It may be made into a stable emulsion, but may not be diluted with water. It appears to be a mixed emulsion because part of it will dilute but the remainder will not. Applied to a test cap, there is a wax deposition and a mechanical washing away of the non-distendible part of the emulsion, all in about 100 seconds.

EXAMPLE 81

|  | Parts by Weight | |
|---|---|---|
|  | a (2051) | b (2055) |
| WSCED–18D | 8.5 | 8.5 |
| Span 40 | 1.2 | 1.2 |
| Tween 40 | 1.2 | 1.2 |
| Carnauba Wax | 3.25 | 3.25 |
| Nonionic RA |  | 10 |
| Water to | 250 | 250 |
| Delay time in seconds | 12.8 | 15.1 |

Formula (a) dilutes poorly. Formula (b) dilutes satisfactorily.

The foregoing shows that the addition of the stabilizing nonionic detergent gives an emulsion suitable for waxing automobiles, in that it may be diluted from the concentrate as formed.

The invention of the present application provides a new method of waxing by spreading an emulsion, then flushing, and it also provides new detergent compositions having a delayed time of deposition during flushing, for detergent action and removal of lifted soil.

In conclusion, it is noted that the science of emulsions is not yet well understood, and that it is complicated. It is more of an art than a science. On that account, the present invention is exemplified more by artful embodiments thereof rather than by scientific evaluations. The applicant offers theory only on the basis of available knowledge in modern texts and publications as it seems to apply to the disclosures herein made, without any intention that he be bound thereby.

In the claims the term "non-substantive" refers to an emulsion stable to any reference surface. The term "exhaust sensitive" refers to the emulsion and to the surface which in contact will effect deposition from the emulsion onto the surface.

The invention in emulsion and method, is subject to numerous changes and modifications from the many examples herein given, and it is to be understood that such are contemplated as falling within the scope of the invention expressed in the appended claims.

I claim:

1. A detergent waxing emulsion of the oil-in-water type chilled to a temperature below the fusing point of the dispersed phase and consisting essentially of water, emulsified carnauba wax, and emulsifier consisting of cationic surface-active emulsifier including water-dispersible quaternary ammonium salt cationic emulsifier containing an aliphatic radical having from 8 to 18 carbon atoms and nonionic surfactant which is a detergent and an emulsifier.

2. An oil-in-water type of emulsion chilled to a temperature below the fusing point of the dispersed phase and consisting essentially of water, emulsified normally solid fusible hydrophobic saponifiable wax which is an ester of high-atomic aliphatic monohydric alcohol and high-atomic monocarboxylic acid, cationic surfactant which is an emulsifier, and nonionic surfactant which is a detergent and an emulsifier, said chilled emulsion being characterized by stability when present as a layer in contact with a surface against which the hereinafter residual chilled emulsion is exhaust-sensitive, and further characterized by formation of an unstable residual chilled emulsion which is exhaust-sensitive to said surface upon reduction in said layer of the effective quantity of said nonionic material either by utilization thereof in said layer by detergent action on said surface or by actual depletion by flushing said layer with water, or by both actions.

References Cited in the file of this patent

UNITED STATES PATENTS

| | | |
|---|---|---|
| 2,206,090 | Haggenmacher | July 2, 1940 |
| 2,343,093 | Smith | Feb. 29, 1944 |